Jan. 24, 1961 R. G. McCULLOCH 2,969,161
BUNG FOR BEER BARRELS AND THE LIKE
Filed March 24, 1958

INVENTOR
ROBERT G. McCULLOCH
BY Emory L. Groff
ATTORNEY

United States Patent Office 2,969,161
Patented Jan. 24, 1961

2,969,161

BUNG FOR BEER BARRELS AND THE LIKE

Robert Givens McCulloch, Blakehurst, near Sydney, New South Wales, Australia, assignor to Ceeco Products Pty. Limited, Belmore, New South Wales, a corporation of Australia Filed Mar. 24, 1958, Ser. No. 723,240

1 Claim. (Cl. 217—106)

This invention has been devised to provide a bung (generally called a shive) for beer barrels and like containers for liquids which will enable a tap fitting or pipe to be connected to the "barrel" without spilling the contents of the barrel during the connecting operation.

A feature of the invention is that the bung, having the said advantage, when fitted to a barrel will be flush with the outer wall thereof so that the barrel can be rolled and manipulated in the same manner as hitherto.

The bung is made of semi-flexible plastic material, for example, a thermoplastic such as polyethene or a material of the styrene group, in a moulding operation.

The bung consists of a tapered cylindrical body adapted to fit a bung hole. The body has an external shoulder adapted to catch on the inner edge of a barrel around the bung hole. An inwardly tapered part extends from the shoulder and facilitates entry of the bung into a bung hole. An inset flange on the outer end has an inwardly projecting connector tube integral therewith. The connector tube has a cap fixed on the inner end in such manner that it can be fractured by pressure of a tap fitting or pipe entered into the connector tube and it has a removable sealing disc in the outer end.

The invention is described in further detail with reference to the annexed drawings wherein.

Figure 1:
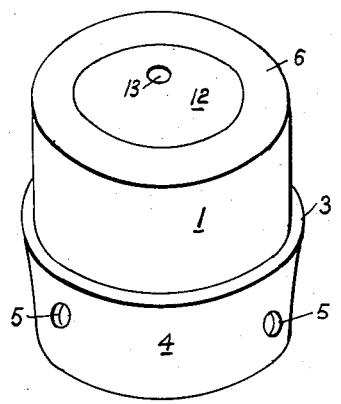
Figs. 1 and 2 are perspective views of the bung taken from opposite angles.
Figure 2:
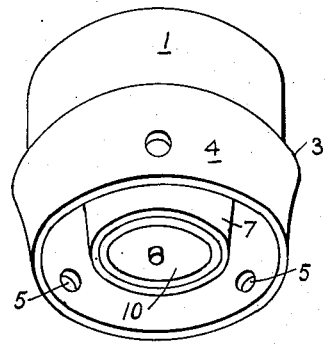
Figure 3:
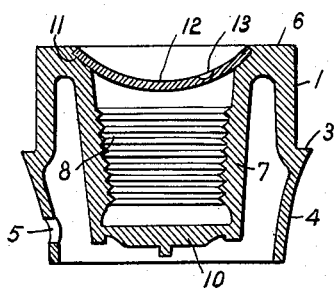
Fig. 3 is a longitudinal central sectional view of the bung.
Figure 4:
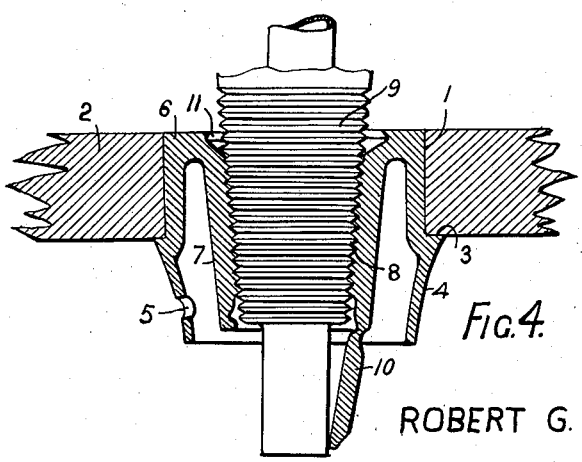
Fig. 4 is a view similar to Fig. 3 showing the bung in a section of a barrel and a tap fitting or pipe in the bung.

Referring to Figs. 1 to 4, the part 1 of the bung is made a driving fit in a bung hole and is as long as the barrel wall 2 is thick. It has an external shoulder 3 thereon which is adapted to catch on the inner edge of the barrel around the bung hole. The inner tapered entry part 4 is made thinner and consequently more flexible than the part 1. This part 4 assists as a lead-in when the bung is being inserted into a barrel and it assists in the collapse of the bung—with the aid of an extractor—when the bung is to be extracted from a barrel. The holes 5 are provided to permit the escape of gas or the like from the interior part of the bung.

Inset flange 6 on the outer end of part 1 has the inwardly projecting tapered connector tube 7 integral therewith. This tube 7 is threaded as at 8 to take a tap fitting or pipe 9. The inner end of the connector tube 7 is closed to a cap 10 which is so joined thereto that it can be fractured at the joint by the end of the tap fitting or pipe 9 when the same is inserted in the connector tube 7.

There is a recessed step 11 in the flange 6 and a dished sealing disc 12 is made a spring fit in the step. The disc is weakened in one part by a recess 13 which can be easily pierced by disc extractor.

I claim:

A semi-flexible plastic bung for a barrel having a bung hole therein, said bung comprising a tapered cylindrical body having an external shoulder thereon, an inwardly tapered entry portion extending downwardly from said shoulder, said shoulder adapted to engage the inner edge of the barrel around the bung hole when said bung is inserted therein, an inset flange on the outer end of said body, a connector tube integral with said inset flange and depending therefrom, said tube tapered inwardly and spaced from the wall of said body, said inset flange having a recessed step adjacent the upper end of said connector tube, a removable outer sealing disc fitted within said recessed step to prevent entry of foreign matter into said connector tube, a partially fracturable cap secured to the inner end of said connector tube and normally sealing in the contents of the barrel, whereby upon removal of said outer disc and insertion of a tap fitting through said connector tube against said cap, the latter will partially break away from said tube to an extent sufficient to permit passage of said fitting into the interior of said barrel for dispensing the contents thereof.

References Cited in the file of this patent

UNITED STATES PATENTS

| 1,933,117 | Markle | Oct. 31, 1933 |
|---|---|---|
| 2,415,339 | Curtis | Feb. 4, 1947 |
| 2,628,264 | Esher | Feb. 10, 1953 |
| 2,657,817 | Alvear | Nov. 3, 1953 |
| 2,814,418 | Rieke | Nov. 26, 1957 |